Oct. 11, 1927.
A. T. CARNES
1,645,127
AUTOMATIC HOSE NOZZLE
Filed July 6, 1925
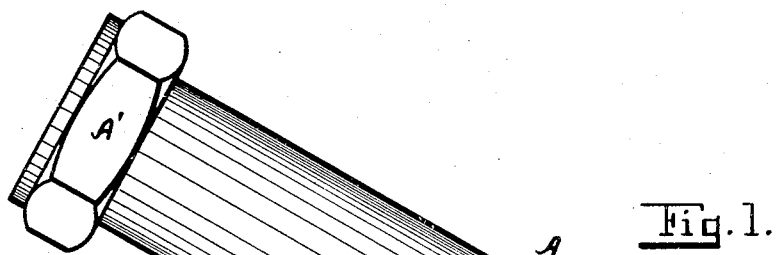
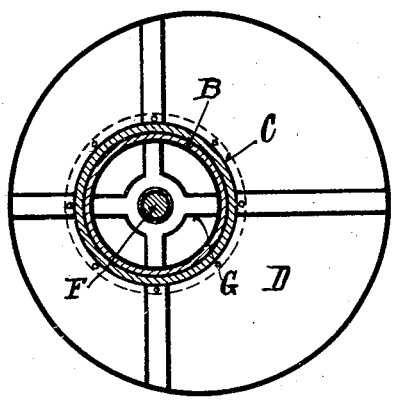
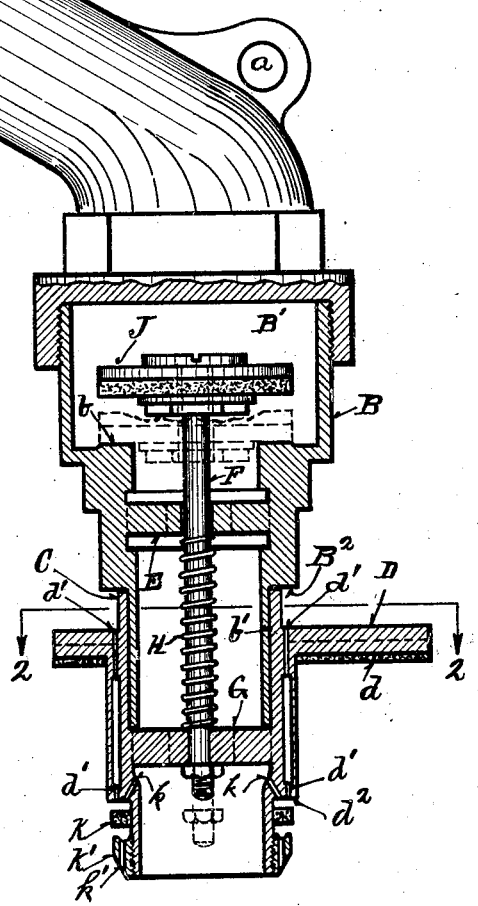
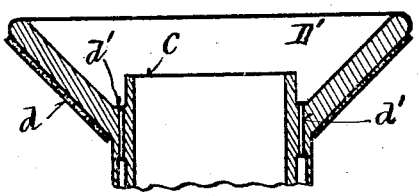
Inventor
Almus T. Carnes
By J. M. Sturgeon
atty.

Patented Oct. 11, 1927.

1,645,127

UNITED STATES PATENT OFFICE.

ALMUS T. CARNES, OF KANSAS CITY, MISSOURI.

AUTOMATIC HOSE NOZZLE.

Application filed July 6, 1925. Serial No. 41,685.

This invention relates to nozzles for filling gasoline tanks of motor vehicles.

The object of this invention is to provide such a nozzle with a valve which automatically closes when the nozzle is withdrawn from the tank so that gasoline will then cease to flow out of the nozzle.

The principal features of my invention consist of a spring-pressed valve connected by a valve stem to a telescopic sleeve which is provided with a flange adapted to engage the bead around the filling orifice and thereby raise the valve and allow gasoline to flow therethrough when the nozzle is pressed downwardly, and allow the valve to close when the nozzle is raised.

These and other features of my invention are hereinafter described, and are illustrated in the accompanying drawings in which:

Figure 1 is a side elevation, partially in vertical central section of a nozzle embodying my invention.

Figure 2 is a transverse section on the line 2—2 in Fig. 1.

Figure 3 is a vertical central section of a modification of the telescopic portion of the nozzle.

In these drawings A indicates the main stem of my improved nozzle, provided with means A' of usual construction for securing the same to a hose (not shown), and with a perforated ear $a$ for hanging it up when not in use.

Secured to the stem A is a valve housing B having therein a valve chamber B' and a valve seat $b$. The lower end of the valve housing is reduced in external diameter at $b'$ so as to form an annular shoulder $B^2$, and slidably mounted on reduced portion $b'$ is a telescopic sleeve C adapted to engage the annular shoulder $B^2$. The sleeve C is provided with a flange D adapted to engage the upper end of the filling orifice of the fuel supply tank of a motor vehicle, whereby the sleeve C can be forced upward to engage the annular shoulder $B^2$.

The valve housing B is provided with an internal spider E having a vertical opening through which a valve stem F passes, said valve stem F having its lower end secured in an internal spider G, and upon the valve stem F between the internal spiders F and G is a spring H, so that when the telescopic sleeve C is forced upwardly into contact with the annular shoulder $B^2$, the valve J secured upon the upper end of the valve stem F is lifted off of its seat $b$, and gasoline can flow through the nozzle, and when the nozzle is lifted upward the spring H forces the telescopic sleeve C, and valve J downward and closes the valve.

Upon the under side of the flange D is placed a disc $d$ of suitable packing material adapted to prevent the escape of gasoline between it and the tank (not shown), and to provide for the escape of air from the tank during the filling operation, vent holes $d'$ are provided, the lower ends of which open through an annular shoulder $d^2$, and upon the lower end of the sleeve C, is placed a valve ring K of cork or other suitable material adapted to slide easily thereon, so that it will float upwardly thereon, when the gasoline in the tank (not shown) rises, and closes the lower holes $d'$, so that gasoline will not flow upwardly through said holes. The floating ring K, is retained on the nozzle by means of a ring K' secured on the nozzle. In order to cause the floating ring to move freely vent holes $k$ are provided so that when the valve J is opened, and gasoline flows through the nozzle, it flows through vent holes $k$ which releases the floating ring K from the annular shoulder $d^2$, and likewise vent holes $k'$ are provided in the ring K' to release the floating ring K from the upper surface thereof, and permit it to float upwardly thereon.

In Fig. 3, I show the flange D' in the shape of an inverted cone, instead of flat as in Figs. 1 and 2, the conical flange D being adapted to be forced upon the filling orifice of the fuel tank (not shown).

Having thus fully shown and described the construction of my invention so that others can utilize the same, the operation thereof will be obvious, therefore what I claim as new and desire to secure by Letters Patent is:

A tubular shank adapted to be secured on a hose, a valve housing adapted to be secured to said shank, a valve seat in said housing, a spider in said housing having a central opening therethrough, a valve-stem in said opening, a valve on said stem adapted to seat upon said valve seat, a nozzle member telescopically mounted on said valve housing, a spider in said nozzle member secured to said valve stem, a spring on said valve-stem between said spiders, a radial flange on said nozzle member, a radial shoulder adjacent to the lower end of said nozzle member having vent openings to the interior of said nozzle member and having other vent openings through said nozzle member and said radial flange, a float ring around said nozzle member adapted to seat against said radial shoulder, and a ring secured around the lower end of said nozzle member whereby said float ring is secured in place.

In testimony whereof I affix my signature.

ALMUS T. CARNES.